L. ETAIX.
PLANT FOR THE MANUFACTURE OF COFFEE EXTRACT.
APPLICATION FILED AUG. 31, 1916.
1,254,129.
Patented Jan. 22, 1918.
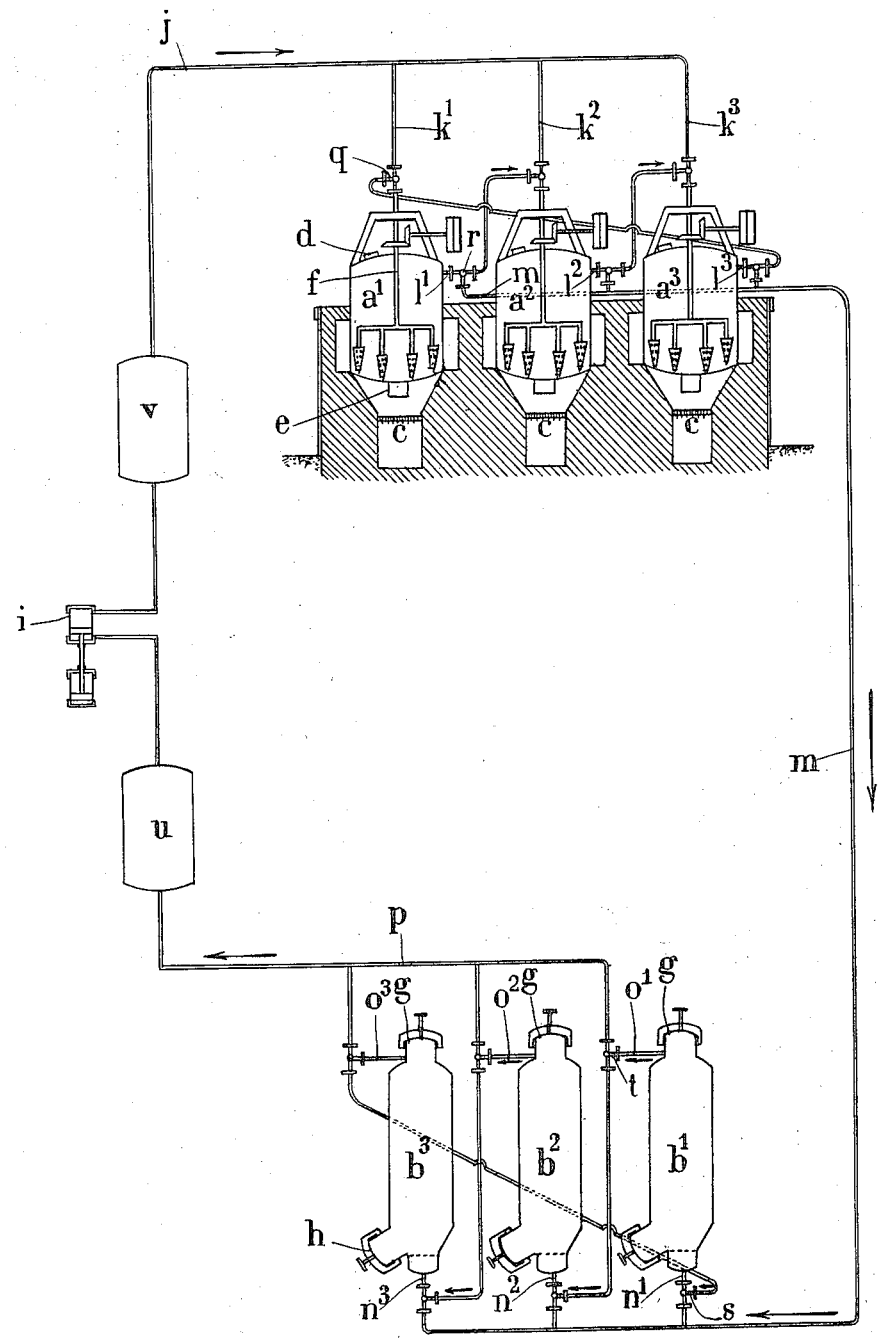
Inventor:
Louis Etaix
per H. W. Plucker
Attorney.

UNITED STATES PATENT OFFICE.

LOUIS ETAIX, OF PARIS, FRANCE.

PLANT FOR THE MANUFACTURE OF COFFEE EXTRACT.

1,254,129.  Specification of Letters Patent.  Patented Jan. 22, 1918.

Application filed August 31, 1916. Serial No. 117,908.

*To all whom it may concern:*

Be it known that I, LOUIS ETAIX, a citizen of the Republic of France, residing at Paris, in the Republic of France, have invented certain new and useful Improvements in Plants for the Manufacture of Coffee Extract, of which the following is a specification.

This invention relates to a plant for use in the manufacture of a dry coffee extract and its object is to provide means for the production of such an extract possessing all the flavor of coffee and containing all the aromatic and volatile substances thereof without alteration.

According to the present invention, the plant comprises means for heating coffee so as to volatilize the aromatic substances thereof and means for bringing the volatilized aromatic substances, while in the volatilized condition, into contact with a previously dearomatized coffee extract, the said means constituting an inclosed circulatory system.

One form of the present invention is illustrated diagrammatically, by way of example, in the accompanying drawing.

The plant illustrated comprises a number of retorts $a^1$, $a^2$, $a^3$ suitably mounted in masonry and heated each by means of a suitable hearth $c$. These retorts are intended to contain ground coffee from which the aromatic substances are to be extracted. Each retort has a charging aperture $d$ for the coffee to be distilled and a discharge opening $e$ for the removal of the material deprived of its aromatic properties.

A supply of dry, cold air or of dry, cold inert gas is admitted into each retort through the hollow shaft of a rotatable device $f$ having hollow perforated arms which extend into the mass contained in each retort and, at the same time, are adapted to effect a thorough agitation of the ground coffee, thus assuring an intimate contact and intermixing of the pulverulent mass with the air or gas.

The plant further comprises an aromatizing apparatus adapted to contain pulverized dry extracts prepared from coffee from which the aromatic substances have been extracted preferably in the retorts $a^1$, $a^2$, $a^3$. This aromatizing apparatus comprises vertical receptacles $b^1$, $b^2$, $b^3$ provided with charging and discharge apertures $g$ and $h$ through which the extract to be aromatized and the aromatized product are respectively fed and discharged.

These receptacles are interconnected by means of a system of pipes provided with three-way cocks, the whole arrangement being such that a methodical circulation may be effected, that is, it permits of the changing, after each operation, of the order in which the gas or air traverses the retorts and receptacles.

The gas is forced by a pump $i$ through a pipe $j$ communicating with each of the inlet pipes $k^1$, $k^2$, $k^3$ of the retorts $a^1$, $a^2$, $a^3$, while the outlet pipes $l^1$, $l^2$, $l^3$ thereof lead into a common pipe $m$. At its opposite end this pipe $m$ is connected to the inlet pipe $n^1$, $n^2$, $n^3$ of the aromatizing receptacles $b^1$, $b^2$, $b^3$, while outlet pipes $o^1$, $o^2$, $o^3$ lead into a common pipe $p$ through which the gases which have been deprived of the volatilized aromatic substances of the coffee are conveyed away. The outlet pipe of each of the retorts $a^1$, $a^2$, is connected to the inlet pipe of one of the adjacent retorts and the outlet pipe of the last retort $a^3$ is connected to the inlet pipe of the first retort $a^1$; likewise, the outlet pipe of each of the aromatizing receptacles $b^1$, $b^2$ is connected to the inlet pipe of one of the adjacent aromatizing receptacles while the outlet pipe of the last receptacle $b^3$ is connected to the inlet pipe of the first receptacle $b^1$.

Three-way cocks $q$, $r$ are provided for each retort $a^1$, $a^2$, $a^3$ and similar cocks $s$, $t$, for the receptacles $b^1$, $b^2$, $b^3$ in order to change at will the sequence in which the retorts $a^1$, $a^2$, $a^3$ and the receptacles $b^1$, $b^2$, $b^3$ are traversed by the air or gas.

The cocks $q$ and $r$ respectively inserted in the inlet and outlet pipes of the retorts $a^1$, $a^2$, $a^3$ are adjusted at first to such a position that the current of air or gas flowing through the pipe $j$ will pass in succession through the retorts $a^1$, $a^2$, $a^3$ and then flow through the pipe $m$.

When the coffee in retort $a^1$ is exhausted of its aromatic properties, this retort is cut out of the circuit, emptied, and filled with a new supply of fresh coffee. The cocks $q$ and $r$ are then adjusted so as to direct the gas or air first through retort $a^2$, then retort $a^3$, and then retort $a^1$.

When the material contained in retort $a^2$ is exhausted of its aromatic properties, the same operation as that described in connection with retort $a^1$ is carried out with retort $a^2$, and so forth.

The treatment of the coffee in the various retorts is thus always methodical, the exhausted material being periodically replaced by fresh coffee which is then at the tail end of the series of retorts.

The aromatizing receptacles $b^1$, $b^2$, $b^3$ are operated in the same way, each of them in turn, being placed at the beginning or at the end of the series by appropriate adjustment of the three-way cocks $s$ and $t$.

After having deposited the charge of aromatic substances in the aromatizing receptacles $b^1$, $b^2$, $b^3$, the air or gas is conveyed back to the pump $i$ through the pipe $p$.

It will thus be understood that by this arrangement it is possible to convey the aroma from the initial material contained in the retorts $a^1$, $a^2$, $a^3$ to the dry extract in the aromatizing receptacles $b^1$, $b^2$, $b^3$ in a methodical manner and without losses occurring in connection with the aromatic substances, since the operation is carried out in a closed circuit.

Two receptacles $u$ and $v$ are inserted in the suction and pressure pipes of the pump $i$ in order to insure a regular and continuous circulation of the gaseous medium.

It is obvious that each retort is provided with a thermometer or other suitable means whereby the temperature of the contents thereof may be ascertained when desired.

It will also be understood that the number of vessels for containing the ground coffee and those for the pulverulent de-aromatized extract may, of course, be varied, and likewise the order or sequence in which they are interconnected may also be varied without departing from the spirit of the invention.

What I claim as new and desire to secure by Letters Patent of the United States is:—

1. A plant for the manufacture of coffee extract, comprising a closed vessel adapted to contain coffee, means for heating the said vessel so as to heat the coffee therein at a temperature approximating that of its point of torrefaction, a supply of cold air or of cold gas, means for directing a current thereof through the coffee and means for directly transferring the said current, loaded with volatilized aromatic substances, to a previously de-aromatized coffee extract.

2. A plant for the manufacture of coffee extract, comprising a series of closed vessels adapted to contain coffee, means for heating the said vessels to volatilize the aromatic substances of coffee therein, means for agitating the coffee, a supply of cold air or of cold inert gas, means for passing a current thereof through the successive vessels and the coffee contained therein, a second series of vessels adapted to contain coffee extract, means for conveying the said current of air or gas, loaded with the volatilized aromatic or gas, loaded with the volatilized aromatic substances, to and through the second series of vessels and the coffee extract therein, means for cutting out of the system the vessels in the first series containing exhausted coffee, and like means for the vessels of the second series containing saturated coffee extract.

3. A plant for the manufacture of coffee extract, comprising a series of interconnected closed vessels adapted to contain ground coffee, means for charging and discharging the said vessels, means for heating the said vessels and the coffee therein, a supply of dry, cold air or of dry, cold, inert gas, a rotatable hollow agitator for passing a current thereof through the successive vessels and the coffee contained therein and for simultaneously agitating the coffee, a second series of interconnected closed vessels adapted to contain pulverized coffee extract, means for charging and discharging the latter vessels, means for conveying the said current of air or gas loaded with aromatic substances, volatilized from the coffee in the first series of vessels, to and through the second series of vessels and the coffee extract therein, three-way cocks for periodically cutting out of the system the vessels in the first series when they contain exhausted coffee and like means for cutting out the vessels of the second series when they contain saturated coffee extract, the respective three-way cocks also serving for varying the sequence in which the current of air or gas passes through the vessels of the two series of closed vessels.

In testimony whereof I have hereunto affixed my signature.

LOUIS ETAIX.

Witnesses:
FRANÇOIS WEBER,
CHAS. P. PRESSLY.